(12) United States Patent
Tinianov

(10) Patent No.: US 7,883,763 B2
(45) Date of Patent: Feb. 8, 2011

(54) ACOUSTICAL SOUND PROOFING MATERIAL WITH CONTROLLED WATER-VAPOR PERMEABILITY AND METHODS FOR MANUFACTURING SAME

(75) Inventor: Brandon Tinianov, Santa Clara, CA (US)

(73) Assignee: Serious Materials, Inc., Sunnyvale, CA (US)

( * ) Notice: Subject to any disclaimer, the term of this patent is extended or adjusted under 35 U.S.C. 154(b) by 0 days.

(21) Appl. No.: 11/734,770

(22) Filed: Apr. 12, 2007

(65) Prior Publication Data
US 2008/0251198 A1 Oct. 16, 2008

(51) Int. Cl.
B32B 27/14 (2006.01)
B32B 13/00 (2006.01)
E04B 1/82 (2006.01)
E04B 9/00 (2006.01)

(52) U.S. Cl. ............... 428/201; 428/198; 428/703; 428/411.1; 428/214; 181/284; 181/290; 181/294; 156/291

(58) Field of Classification Search ................ 181/294; 428/198; 52/787.11, 144, 791.1; 156/291
See application file for complete search history.

(56) References Cited

U.S. PATENT DOCUMENTS

| | | | |
|---|---|---|---|
| 2,811,906 A | 11/1957 | Chappell | |
| 3,160,549 A | 12/1964 | Caldwell et al. | |
| 3,215,225 A | 11/1965 | Kirschner | |
| 3,336,710 A | 8/1967 | Raynes | |
| 3,399,104 A | 8/1968 | Ball, III et al. | |
| 3,424,270 A | 1/1969 | Hartman et al. | |
| 3,462,899 A | 8/1969 | Sherman | |
| 3,579,941 A | 5/1971 | Tibbals | |
| 3,642,511 A | 2/1972 | Cohn et al. | |
| 3,828,504 A | 8/1974 | Egerborg et al. | |
| 4,003,752 A | 1/1977 | Osohata et al. | |
| 4,112,176 A | 9/1978 | Bailey | |
| 4,156,615 A | 5/1979 | Cukier et al. | |
| 4,347,912 A | 9/1982 | Flocke et al. | |
| 4,375,516 A | 3/1983 | Barrall | |

(Continued)

FOREIGN PATENT DOCUMENTS

CA 2219785 10/1996

(Continued)

OTHER PUBLICATIONS

Spec-Data Quiet Solution Datasheet, Reed Construction Data, (2005).*

(Continued)

Primary Examiner—David R Sample
Assistant Examiner—Prashant J Khatri
(74) Attorney, Agent, or Firm—Haynes and Boone, LLP

(57) ABSTRACT

A laminated structure appropriate for use in constructing walls, floors, ceilings or doors, has a selected area and in one embodiment comprises two external layers of one or more materials such as, but not limited to, gypsum, at least one internal constraining layer having less than said selected area, and two or more internal layers of a viscoelastic glue separated by said at least one internal constraining layer, wherein each of said layers of viscoelastic glue is patterned to cover a selected percentage, but not all, of said area of said laminated structure thereby to allow moisture to pass through said structure.

31 Claims, 9 Drawing Sheets

U.S. PATENT DOCUMENTS

| | | |
|---|---|---|
| 4,487,793 A | 12/1984 | Haines et al. |
| 4,618,370 A | 10/1986 | Green et al. |
| 4,642,951 A | 2/1987 | Mortimer |
| 4,663,224 A | 5/1987 | Tabata et al. |
| 4,678,515 A | 7/1987 | Green et al. |
| 4,685,259 A | 8/1987 | Eberhart et al. |
| 4,759,164 A | 7/1988 | Abendroth et al. |
| 4,778,028 A | 10/1988 | Staley |
| 4,786,543 A | 11/1988 | Ferm |
| 4,924,969 A | 5/1990 | K'Heureux |
| 4,956,321 A | 9/1990 | Barrall |
| 4,967,530 A | 11/1990 | Clunn |
| 5,016,413 A | 5/1991 | Counihan |
| 5,026,593 A | 6/1991 | O'Brien |
| 5,033,247 A | 7/1991 | Clunn |
| 5,063,098 A | 11/1991 | Niwa et al. |
| 5,110,660 A | 5/1992 | Wolf et al. |
| 5,125,475 A | 6/1992 | Ducharme et al. |
| 5,158,612 A | 10/1992 | Savoly et al. |
| 5,240,639 A | 8/1993 | Diez et al. |
| 5,256,223 A | 10/1993 | Alberts et al. |
| 5,258,585 A | 11/1993 | Juriga |
| 5,334,806 A | 8/1994 | Avery |
| 5,342,465 A | 8/1994 | Bronowicki et al. |
| 5,368,914 A | 11/1994 | Barrett |
| 5,439,735 A | 8/1995 | Jamison |
| 5,473,122 A | 12/1995 | Kodiyalam et al. |
| 5,474,840 A | 12/1995 | Landin |
| 5,502,931 A | 4/1996 | Munir |
| 5,603,192 A | 2/1997 | Dickson |
| 5,629,503 A | 5/1997 | Thomasen |
| 5,643,666 A | 7/1997 | Eckart et al. |
| 5,644,880 A | 7/1997 | Lehnert et al. |
| 5,664,397 A | 9/1997 | Holz |
| 5,691,037 A | 11/1997 | McCutcheon et al. |
| 5,695,867 A | 12/1997 | Saitoh et al. |
| 5,768,841 A | 6/1998 | Swartz et al. |
| 5,824,973 A | 10/1998 | Haines et al. |
| 5,867,957 A | 2/1999 | Holtrop |
| 5,910,082 A | 6/1999 | Bender et al. |
| 5,945,208 A | 8/1999 | Richards et al. |
| 5,954,497 A | 9/1999 | Cloud et al. |
| 6,077,613 A | 6/2000 | Gaffigan |
| 6,123,171 A | 9/2000 | McNett et al. |
| 6,213,252 B1 | 4/2001 | Ducharme |
| 6,240,704 B1 | 6/2001 | Porter |
| 6,266,427 B1 | 7/2001 | Mathur |
| 6,286,280 B1 | 9/2001 | Fahmy et al. |
| 6,290,021 B1 | 9/2001 | Strandgaard |
| 6,309,985 B1 | 10/2001 | Virnelson et al. |
| 6,342,284 B1 | 1/2002 | Yu |
| 6,381,196 B1 | 4/2002 | Hein et al. |
| 6,389,771 B1 | 5/2002 | Moller |
| 6,443,256 B1 | 9/2002 | Baig |
| 6,632,550 B1 | 10/2003 | Yu et al. |
| 6,676,744 B2 | 1/2004 | Merkley et al. |
| 6,699,426 B1 | 3/2004 | Burke |
| 6,715,241 B2 | 4/2004 | Gelin et al. |
| 6,758,305 B2 | 7/2004 | Gelin et al. |
| 6,790,520 B1 | 9/2004 | Todd et al. |
| 6,800,161 B2 | 10/2004 | Takigawa et al. |
| 6,803,110 B2 | 10/2004 | Drees et al. |
| 6,815,049 B2 | 11/2004 | Veramasuneni |
| 6,822,033 B2 | 11/2004 | Yu |
| 6,825,137 B2 | 11/2004 | Fu et al. |
| 6,877,585 B2 | 4/2005 | Tinianov |
| 6,913,667 B2 | 7/2005 | Nudo et al. |
| 6,920,723 B2 | 7/2005 | Downey |
| 6,941,720 B2 | 9/2005 | DeFord et al. |
| 7,041,377 B2 | 5/2006 | Miura et al. |
| 7,068,033 B2 | 6/2006 | Sellers et al. |
| 7,181,891 B2 | 2/2007 | Surace et al. |
| 7,197,855 B2 | 4/2007 | Della Pepa |
| 2003/0070367 A1* | 4/2003 | Gelin et al. .................... 52/144 |
| 2004/0016184 A1 | 1/2004 | Huebsch et al. |
| 2004/0168853 A1 | 9/2004 | Gunasekera et al. |
| 2004/0214008 A1 | 10/2004 | Dobrusky et al. |
| 2005/0050846 A1* | 3/2005 | Surace et al. ............... 52/782.1 |
| 2005/0103568 A1 | 5/2005 | Sapoval et al. |
| 2006/0048682 A1 | 3/2006 | Wagh et al. |
| 2006/0057345 A1 | 3/2006 | Surace et al. |
| 2006/0059806 A1 | 3/2006 | Gosling et al. |
| 2006/0108175 A1 | 5/2006 | Surace et al. |
| 2007/0094950 A1 | 5/2007 | Surace et al. |
| 2007/0107350 A1 | 5/2007 | Surace et al. |

FOREIGN PATENT DOCUMENTS

| | | |
|---|---|---|
| EP | 1154087 B1 | 11/2001 |
| JP | 09-203153 | 8/1997 |
| WO | WO 96/34261 | 10/1996 |
| WO | WO 97/19033 | 5/1997 |
| WO | WO 00/24690 | 5/2000 |

OTHER PUBLICATIONS

Armstrong Basic Drywall Grid Installation Guide, http://web.archive.org/web/*/http://www.armstrong.com/common/c2002/content/files/4279.pdf. (Original Publication Date May 30, 2005, Retrieved Aug. 19, 2008).* www.acousticalsolutions.com/products/pdfs/install_green_glue.pdf. accessed Nov. 5, 2009. web date Jun. 19, 2006.*

Cheng et al. "Vibration Attenuation of Panel Structures by Optimally Shaped Viscoelastic Coating with Added Weight Considerations". Thin-Walled Structures, 21 (1995), pp. 307-326.*

AVS Forum "Green Glue(R)", http://www.avsforum.com/avs-vb/archive/index.php/t-456614-p-2.html, retrieved Jul. 19, 2010.*

Vandersall, H. L., "*Intumescent Coating Systems, Their development and Chemistry*" J. Fire & Flammability, vol. 2 (Apr. 1971) pp. 97-140 (45 pages).

English Language Abstract, JP Patent First Publication No. 09-203153, Aug. 5, 1997, (2 pages).

*A Study Of Techniques To Increase The Sound Of Insulation Of Building Elements*, Wyle Laboratories, Prepared for Dept. of Housing and Urban Development, Jun. 1973 (16 pages).

*Field Sound Insulation Evaluation Of Load-Beating Sandwich Panels For Housing*, Final Report, Prepared by Robert E. Jones, Forest Products Laboratory, Forest Service, U.S. Department of Agriculture, Aug. 1975 (53 pages).

*Sound Studio Construction On A Budget*, F. Alton Evererst, McGraw-Hill, 1997 (7 pages).

*Wood Handbook/Wood as an Engineering Material*, United States Department of Agriculture, Forest Service, General Technical Report FPL-GTR-113, Mar. 1999 (24 pages).

*Transmission Loss Of Plasterboard Walls* by T. D. Northwood, Building Research Note, Division of Building Research, National Research Counsel, Ottawa, Canada (10 pages).

*A Guide To Airborne, Impact, and Structureborne Noise Control in Multifamily Dwellings*, U. S. Department Of Housing And Urban Development, Prepared for the National Bureau of Standards, Washington, D. C., Jan. 1963 (5 pages).

*Transmission Loss Of Leaded Building Materials*, Paul B. Ostergaard, Richmond L. Cardinell, and Lewis S. Goodfriend, The Journal Of The Acoustical Society Of America, vol. 35, No. 6, Jun. 1963 (7 pages).

*Dictionary Of Architecture & Construction 2200 illustrations*, Third Edition, Edited by Cyril M. Harris, Professor Emeritus Of Architecture Columbia University, McGraw-Hill, 2000 (7 pages).

*Dictionary Of Engineering Materials*, Harald Keller, Uwe Erb, Wiley-Interscience by John Wiley & Sons, Inc. 2004 (4 pages).

*Chamber Science and Technology Dictionary*, by Professor Peter M. B. Walker, W & R Chambers Ltd and Cambridge University Press, 1988 (3 pages).

Noise and Vibration Control Engineering: *Principles and Applications*, Edited by Leo Beranek and Instvan Ver, Chapter 11, John Wiley & Sons, Inc., 1002, (12 pages).
Handbook of *Acoustical Measurements and Noise Control*, Edited by Cyril Harris, Chapter 32; Structureborne Sound Isolation, Chapter 33; Noise Control in Buildings, McGraw-Hill, Inc., 1991, (36 pages).
"Green Glue is your soundproofing solution and noise reduction material", www.greengluecompany.com (2 pages).
Acoustical: *A Sound Approach To Testing*, www.archest.com/pages (2 pages).
STC—*Sound Transmission Class—Discussion And Use*, www.sota.ca/stc_info.htm (3 pages).
ASTM International, Designation: C 1396/C 1396M-04, *Standard Specification For Gypsum Board* (7 pages).
Barbara C. Lippiatt, National Institute of Standards and Technology. BEES 3.0, "*Building For Environmental And Economic Sustainability* Technical Manual and User Guide", Oct. 2002, (198 pages).
Takada, et al., *Effect In Reducing Floor Impact Noise Of Recycled Paper Damper Members*, Bulletin of Tokyo Metropolitan Industrial Technology Research Institute, No. 2 (1999) [certified English translation] (13 pages).
*Architectural Acoustics*, M. David Egan, J. Ross Publishing (Reprint 2007) p. 211; originally published McGraw-Hill, 1988 (5 pages).
Hastings, Mardi C.; Godfrey, Richard; Babcock, G. Madison, *Application Of Small Panel Damping Measurements To Larger Walls*, Proc. SPIE vol. 2720, p. 70-76, Smart Structures and Materials 1996: Passive Damping and Isolation (7 pages).
van Vuure, A.W.; Verpoest, I., Ko, F.K., *Sandwich-Fabric Panels As Spacers In A Constrained Layer Structural Damping Application*, Composites Part B 32 (2001) 11-19, Elsevier Science Ltd. (9 pages).
Noise and Vibration Control, Revised Edition, pp. 306-315, Institute of Noise Control Engineering, 1988, Beranek, Leo L. (editor) (9 pages).
Noise and Vibration Control, Chapter Fourteen, *Damping Of Panels*, Ungar, Eric E., pp. 434-473, McGraw-Hill, 1971, Beranek, Leo L. (editor) (7 pages).
Noise and Vibration Control Engineering, *Principles and Application*, pp. 466-479, John Wiley & Sons, 1992, Beranek, Leo L. and Ver, Istvan L. (editors) (9 pages).
Nashif, Ahid D.; Jones, David I. G.; Henderson, John P., *Vibration Damping*, pp. 290-305, John Wiley & Sons, 1985 (18 pages).
Architectural Acoustics, Principles and Practice, John Wiley & sons, 1992, Cavanaugh, William J. and Wilkes, Joseph A. (editors) (332 pages).
FIRE Resistance Design Manual, Sound Control, Gypsum Association, GA-600-94 (14th Ed.) (107 pages).
FIRE Resistance Design Manual, Sound Control, Gypsum Association, GA-600-97 (15th Ed.) (120 pages).
FIRE Resistance Design Manual, Sound Control, Gypsum Association, GA-600-2000 (16th Ed.) (139 pages).
Noxon, Arthur M., *The Chain Is As Strong As Its Weakest Link*, An article written for the first Hong Kong HiFi Show, 1993, Translated and Published in Chinese, http://www.acousticsciences.com/articles/chain.htm (7 pages).

*Quiet Lightweight Floor Systems*, Reprint from Sound and Vibration Magazine, Jul. 1992, by David A. Harris, Building & Acoustic Design Consultants (7 pages).
Joyal, Brian, *Constrained-Layer Systems Provide Weight-Efficient, High Level Damping* (4 pages).
Dynamat materials http://web.archive.org/web/20010525113753/www.admteschusa.com/Dynamat.html Jun. 12, 2007, ADM Tech—Dynamic Control (15 pages).
Noise Killer: Pro Damping Compound Materials http://www.tnt-audio.com/clinica/noise.html May 18, 2007, 1998 (3 pages).
Waybackmachine search results for Jan. 1, 1996-Jun. 12, 2007 (1 page).
Frankovich, David, *The Four-Fold Method Of Noise and Vibration Control* (8 pages).
Renninger, Jennifer, *Understanding Damping Techniques for Noise and Vibration Control* (8 pages).
Unified Facilities Criteria (UFC) *Noise and Vibration Control*, UFC 3-450-01. May 15, 200, Department of Defense (156 pages).
United States Gypsum, *Architectural and Construction Services, Design Data for Acousticians*, Feb. 1986 (4 pages).
*A Study of Techniques To Increase The Sound Of Insulation Of Building Elements*, Wyle Laboratories, Prepared for Dept. of Housing and Urban Development, Jun. 1973 (12 pages).
dB-Ply materials Sound Reducing Panels from Greenwood Forest Products, Inc., Apr. 24, 1997 (9 pages).
dB-Rock materials OMNI Products, Inc. (3 pages).
ASC WallDamp materials from Acoustic Sciences Corporation http://web.archive.org/web/20021013031149/www.asc-soundproof.com/index-walldamp... May 18, 2007 (21 pages).
Sounddown Viscoelastic Glue DG-A2, Soundown Corporation (2 pages).
Nordisk Akustik A/S materials, http://web.archive.org/web/200206240933724/www.nordisk-akustik.dk/html_uk/prod03.ht... Jun. 11, 2007 (4 pages).
IES 2000 *Dampening And Visocelastic Membranes* (Jul. 2, 2003) Atlanta.com/product (pp. 1-6).
Waybackmachine search results for Jan. 1, 1996-May 3, 2006 (1 page).
"*Damping of plate flexural vibrations by means of viscoelastic laminae*" by D. Ross, E.E. Ungar, and E.M. Kerwin—Structural Damping, Section III, ASME, 1959, New York (41 pages).
Notification of Transmittal of the International Search Report in corresponding International Application No. PCT/US08/59960 dated Jul. 11, 2008 ( 1 page).
Internatioanl Search Report in corresponding International Application No. PCT/US08/59960 dated Jul. 11, 2008 (2 pages).
Written Opinion of the International Searching Athority in corresponding Internaitonal Application No. PCT/US09/59960 dated Jul. 11, 2008 (7 pages).

* cited by examiner

PERMEANCE TEST OF A SAMPLE PANEL 100

| DAY | Weight (Grams) | Fitted Straight Curve |
|---|---|---|
| 0 | 3,848.4 | 3,848.3 |
| 1 | 3,850.0 | 3,850.4 |
| 2 | 3,852.5 | 3,852.4 |
| 3 | 3,854.7 | 3,854.5 |
| 4 | 3,856.7 | 3,856.6 |
| 5 | 3,858.8 | 3,858.7 |
| 6 | 3,860.7 | 3,860.8 |
| 7 | 3,862.6 | 3,862.8 |
| 8 | 3,864.9 | 3,864.9 |
| 9 | 3,867.0 | 3,867.0 |
| 10 | 3,869.1 | 3,869.1 |
| 11 | 3,871.0 | 3,871.1 |
| 12 | 3,873.4 | 3,873.2 |
| 13 | 3,875.5 | 3,875.3 |
| 14 | 3,877.1 | 3,877.4 |

Sound Attenuation (dB)

| Freq (Hz) | Percent Coverage | | | | | |
|---|---|---|---|---|---|---|
| | 20% | 40% | 60% | 80% | 100% | 0% |
| 63 | 15 | 14 | 15 | 15 | 15 | 19 |
| 80 | 16 | 17 | 16 | 15 | 14 | 23 |
| 100 | 21 | 22 | 21 | 21 | 18 | 18 |
| 125 | 29 | 29 | 29 | 29 | 29 | 13 |
| 160 | 35 | 34 | 35 | 35 | 34 | 13 |
| 200 | 34 | 34 | 34 | 35 | 36 | 25 |
| 250 | 38 | 39 | 39 | 38 | 38 | 38 |
| 315 | 42 | 42 | 43 | 42 | 41 | 36 |
| 400 | 43 | 43 | 43 | 42 | 43 | 36 |
| 500 | 46 | 46 | 46 | 46 | 45 | 39 |
| 630 | 48 | 48 | 48 | 47 | 47 | 44 |
| 800 | 50 | 50 | 50 | 49 | 50 | 43 |
| 1000 | 51 | 52 | 51 | 50 | 51 | 47 |
| 1250 | 53 | 54 | 54 | 52 | 53 | 47 |
| 1600 | 54 | 55 | 55 | 53 | 53 | 47 |
| 2000 | 52 | 53 | 52 | 51 | 50 | 40 |
| 2500 | 52 | 52 | 52 | 50 | 49 | 37 |
| 3150 | 53 | 54 | 53 | 52 | 50 | 43 |
| 4000 | 52 | 54 | 53 | 52 | 52 | 48 |
| 5000 | 54 | 55 | 55 | 54 | 55 | 53 |

FIG. 7

ACOUSTICAL SOUND PROOFING MATERIAL WITH CONTROLLED WATER-VAPOR PERMEABILITY AND METHODS FOR MANUFACTURING SAME

BACKGROUND OF THE INVENTION

Noise control and moisture management constitute two rapidly growing economic and public policy concerns for the construction industry. Areas with high acoustical isolation (commonly referred to as 'soundproofed') are requested and required for a variety of purposes. Apartments, condominiums, hotels, schools and hospitals all require rooms with walls, ceilings and floors that reduce the transmission of sound thereby minimizing, or eliminating, the disturbance to people in adjacent rooms. Soundproofing is particularly important in buildings adjacent to public transportation, such as highways, airports and railroad lines. Additionally theaters, home theaters, music practice rooms, recording studios and others require increased noise abatement. Likewise, hospitals and general healthcare facilities have begun to recognize acoustical comfort as an important part of a patient's recovery time. One measure of the severity of multi-party residential and commercial noise control issues is the widespread emergence of model building codes and design guidelines that specify minimum Sound Transmission Class (STC) ratings for specific wall structures within a building. Another measure is the broad emergence of litigation between homeowners and builders over the issue of unacceptable noise levels. To the detriment of the U.S. economy, both problems have resulted in major builders refusing to build homes, condos and apartments in certain municipalities; and in widespread cancellation of liability insurance for builders.

In addition to the issue of noise control, moisture management is an equally important construction industry concern. The problems associated with excessive moisture in building wall cavities and the resulting mold growth, have driven a national outcry over unhealthy buildings and poor indoor air quality. Walls between areas of differing temperature are the primary structures for these problems. Preventing condensation is of particular importance with regard to the exterior walls of a home or other buildings, where temperature extremes are likely to be greater than between interior walls. Wetting of exterior building surfaces and rainwater leaks are major causes of water infiltration, but so is excessive indoor moisture generation. Moisture may be present within a structure due to occupancy and use by humans, use of wet materials during construction, air leaks, or transportation by external wall materials. Moisture accumulates when the rate of moisture entry into an assembly (or its generation from within, such as cooking, bathing, painting and other activities) exceeds the rate of moisture removal. The flow of moisture and water vapor is controlled via a vapor resistive membrane or material termed a vapor retarder. A vapor retarder is defined as a membrane or panel having a water vapor transmission rate of less than one perm. See paragraph [0007] below for the definition of a "perm". Conversely, an air retarder is a membrane or panel having a water vapor transmission rate of less than five perms. High perm values ensure ready transmission of water vapor. Common vapor retarders include polyethylene films and foil.

It is obvious that the problem is compounded when a single wall or structure needs to effectively both abate high noise levels and allow for proper water vapor transport without leakage.

For example, a conflict in the two requirements is evident in the case of a new class of damped drywall panels designed for soundproofing. These panels are an improvement to traditional noise control materials such as resilient channels, double stud framing or multiple drywall layers because they offer a materials and labor savings over traditional techniques. However, they have major shortcomings with regard to proper water vapor transport. These damped drywall panels incorporate a continuous film of polymer and therefore act as a vapor retarder. The Department of Energy (DOE) and the American Society of Heating, Refrigeration, and Air-Conditioning Engineers (ASHRAE) and other building science organizations have established recommended wall designs and the proper location of a vapor retard within the wall. These designs are dependant upon the local climate. In cooling-dominated climates, it is recommended that a vapor retarder be installed on the exterior of the thermal insulation. In mixed zones—climates with both significant heating and cooling requirements—design recommendations suggest the omission of the vapor retarder altogether. If these guidelines are not observed, the structure is at risk of allowing water vapor condensation within the wall cavity.

If these materials are used in conjunction with a typical vapor barrier serious problems may develop. A wall having a vapor barrier on both sides of the structure should be avoided so that moisture will not be trapped and condensed, leading to mold or wood rot. Traditional methods have used one or more layers of typical drywall (which allows for ready transport of water vapor) on the interior side of the wall structure and a vapor barrier on the exterior side of the wall structure. Such a design diminishes the moisture-related problems, however the typical wall structure provides little sound attenuation.

A figure of merit for the sound reducing qualities of a material or method of construction is the material's Sound Transmission Class (STC). The STC numbers are ratings Which are used in the architectural field to rate partitions, doors and windows for their effectiveness in blocking sound. The rating assigned to a particular partition design as a result of acoustical testing represents a best fit type of approach to a set of curves that define the sound transmission class. The test is conducted in such a way as to make it independent of the test environment and gives a number for the partition only. The STC measurement method is defined by ASTM E90 laboratory test for sound measurements obtained in ⅓ octave bands, and ASTM E413 for calculating STC numbers from the sound transmission loss data for a structure. These standards are available on the Internet at http://www.astm.org.

A figure of merit for the measurement of the transport of water vapor, by a material or method of construction, is its permeance, or "perms". One perm is defined as the transport of one grain of water per square foot of exposed area per hour with a vapor pressure differential of 1-inch of mercury (Hg). Vapor pressure is a function of the temperature and relative humidity (RH) of the air to which a test structure is exposed, and may be found in many standard data tables. The vapor pressure at any certain RH is found by the product of the RH and the vapor pressure for saturated air at a certain temperature. For example, at 70 degrees Fahrenheit the saturated vapor pressure is 0.7392 inches Hg and the vapor pressure at fifty percent RH is 0.3696 inches Hg. The testing methodology varies depending upon the subject material. Data presented herein after was taken using the ASTM E96 "dry cup" method. Further information may be found on the Internet at http://www.astm.org.

Accordingly, what is needed is a new material and a new method of construction to reduce the transmission of sound from a given room to an adjacent area while simultaneously allowing the controlled transport of moisture from an area of higher concentration to an area of lower concentration.

SUMMARY

In accordance with the present invention, a new laminar structure and associated manufacturing process are disclosed which significantly improve the ability of a wall, ceiling, floor or door to transport water vapor from an area of high vapor pressure to an area with a lower vapor pressure while simultaneously reducing the transmission of sound from one room to an adjacent room, or from the exterior to the interior of a room, or from the interior to the exterior of a room.

The material comprises a lamination of several different materials. In accordance with one embodiment, a laminar substitute for drywall comprises a sandwich of two outer layers of selected thickness gypsum board which are glued to each other, using a sound dissipating adhesive wherein the sound dissipating adhesive is applied in a certain pattern to less than all of the interior surfaces of the two outer layers. In one embodiment, the glue layer is a specially formulated QuietGlue®, which is a viscoelastic material, of a specific thickness. Formed on the interior surfaces of the two gypsum boards, the glue layer is about 1/16 inch thick. In one instance, a 4 foot×8 foot panel constructed using a 1/16 layer of glue has a total thickness of approximately 5/8 inches and has a permeance rating of approximately 5 perms and an STC value of approximately 38. Water vapor is transported by the gypsum sheet through the portions of the gypsum boards that are not covered with glue. A double-sided wall structure constructed as-described provides an STC value of approximately 49. The result is a reduction in noise transmitted through the wall structure of approximately 15 db compared to the same structure using common (untreated) gypsum boards of equivalent mass and thickness.

In one embodiment, the laminated sheets of this invention use a unique glue capable of substantially dissipating sound and vibration which reduces the transmission of the sound from one layer to the adjacent layer of material. The resulting attenuation of sound is significantly improved compared to the attenuation of sound obtained using standard drywall. By covering less than all of the area between the laminated sheets, for example 20 percent coverage, wherein the glue is applied to individual areas with less than a certain maximum separation between the individual application areas, the gypsum material provides additional sound dissipation while also transporting water vapor.

BRIEF DESCRIPTION OF THE DRAWINGS

This invention will be more fully understood in light of the following drawings taken together with the following detailed description.

FIG. 7 shows detailed results data of a sound attenuation test for several embodiments of this invention.

DESCRIPTION OF SOME EMBODIMENTS

The following detailed description is meant to be exemplary only and not limiting. Other embodiments of this invention, such as the number, type, thickness, dimensions, area, shape, and placement order of both external and internal layer materials, will be obvious to those skilled in the art in view of this description.

The process for creating laminar panels in accordance with the present invention takes into account many factors: exact chemical composition of the glue; pressing process; and drying and dehumidification process.

Figure 1:
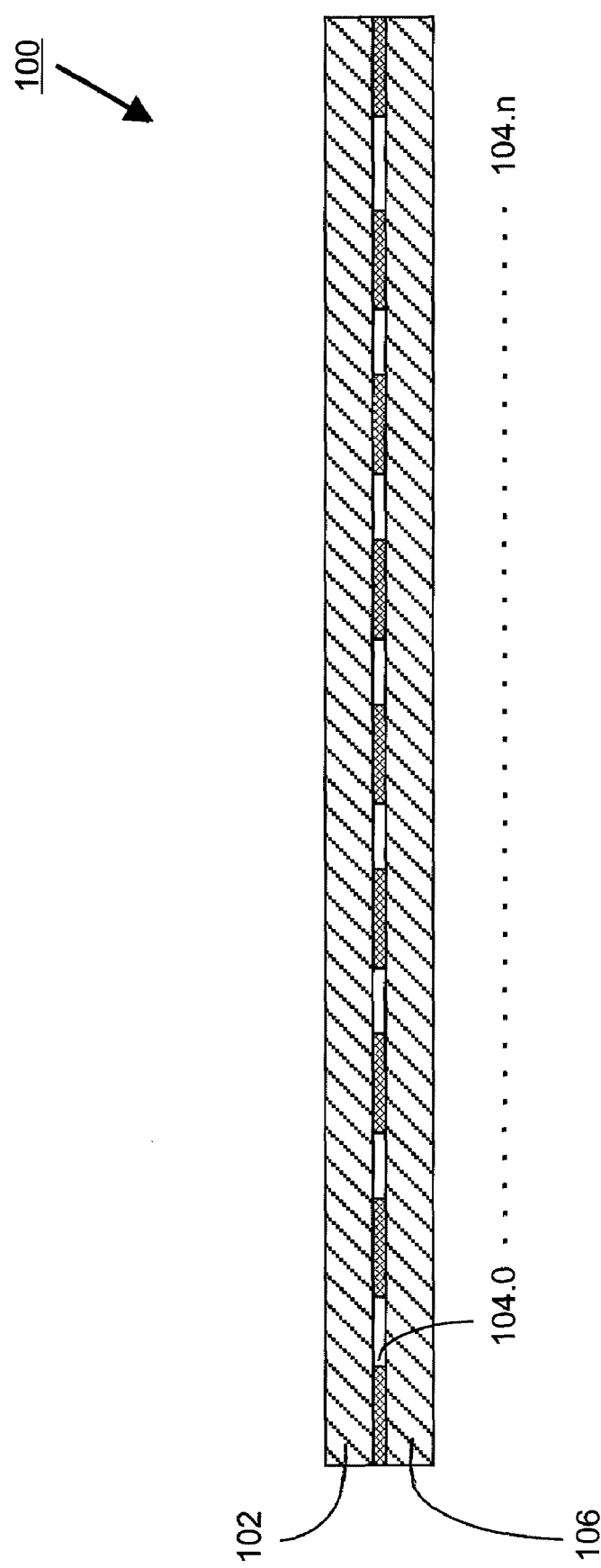
FIG. 1 shows a laminar structure fabricated in accordance with this invention for reducing the transmission of sound through the material while providing for the transportation of moisture through the material.

FIG. 1 shows the laminar structure of one embodiment of this invention. In FIG. 1, the layers in the structure will be described from top to bottom with the structure oriented horizontally as shown. It should be understood, however, that the laminar structure of this invention will be oriented vertically when placed on vertical walls and doors, as well as horizontally or even at an angle when placed on ceilings and floors. Therefore, the reference to top and bottom layers is to be understood to refer only to these layers as oriented in FIG. 1 and not in the context of the vertical use of this structure. In FIG. 1, the assembly numerated as 100 refers to an entire laminated panel constructed in accordance with this invention. A top layer 102 is made up of a standard gypsum material and in one embodiment is 1/4 inch thick. Of course, other thicknesses can be used for any of the layers as desired. The thicknesses are limited only by the acoustical attenuation (i.e., STC rating) desired for the resulting laminar structure and by the weight of the resulting structure which will limit the ability of workers to install the laminar layer on walls, ceilings, floors and doors for its intended use.

The gypsum board in top layer 102 typically is fabricated using standard well-known techniques and thus the method for fabricating the gypsum board will not be described. Next, on the bottom of the gypsum board 102 is a patterned layer of glue 104 called QuietGlue®. We have discovered that contrary to prior understanding, a pattern of glue covering about twenty percent (20%) or more of the gypsum board bottom surface gives substantially the same sound attenuation as a complete layer of glue of the same thickness. Glue 104, made of a viscoelastic polymer, has the property that the energy in the sound which interacts with the glue, when constrained by surrounding layers, will be significantly dissipated by the glue thereby reducing the sound's amplitude across a broad frequency spectrum, and thus reducing the energy of sound which will transmit through the resulting laminar structure. Typically, this glue 104 is made of the materials as set forth in TABLE 1, although other glues having similar characteristics to those set forth directly below Table 1 can also be used in this invention. The glue layer will be generally referred to by reference numeral 104, but is shown in FIG. 1 as 104.0 to 104.n to reflect that FIG. 1 shows a cross section of a laminated structure wherein the glue layer is patterned, not a solid, continuous layer.

TABLE 1

QuietGlue 320

| COMPONENTS | WEIGHT % | | |
|---|---|---|---|
|  | Min | Max | Preferred |
| acrylate polymer | 33.00% | 70.00% | 60.00% |
| ethyl acrylate, methacrylic acid, polymer with ethyl-2-propenoate | 0.05% | 3.00% | 0.37% |
| hydrophobic silica | 0.00% | 0.50% | 0.21% |
| paraffin oil | 0.10% | 5.00% | 1.95% |
| silicon dioxide | 0.00% | 0.50% | 0.13% |
| sodium carbonate | 0.01% | 1.50% | 0.66% |
| stearic acid, aluminum salt | 0.00% | 0.50% | 0.13% |
| surfactant | 0.00% | 1.50% | 0.55% |
| rosin ester | 1.00% | 9.00% | 4.96% |
| water | 25.00% | 40.00% | 30.87% |
| 2-Pyridinethiol, 1-oxide, sodium salt | 0.00% | 0.50% | 0.17% |

The preferred formulation is but one example of a viscoelastic glue. Other formulations may be used to achieve similar results and the range given is an example of successful formulations investigated here.

The physical solid-state characteristics of QuietGlue® include:

1) a broad glass transition temperature below room temperature;
2) mechanical response typical of a rubber (i.e., elongation at break, low elastic modulus);
3) strong peel strength at room temperature;
4) weak shear strength at room temperature;
6) does not dissolve in water (swells poorly); and
7) peels off the substrate easily at temperature of dry ice.

QuietGlue® may be obtained from Serious Materials, 1259 Elko Drive, Sunnyvale, Calif. 94089.

Gypsum board layer 106 is placed on the bottom of the structure and carefully pressed in a controlled manner with respect to uniform pressure (pound per square inch), temperature and time.

Finally, the assembly is subjected to dehumidification and drying to allow the panels to dry, typically for forty-eight (48) hours.

In one embodiment of this invention, the glue 104, when spread over the bottom surface of top layer 102 either as a continuous layer or in a pattern, is subject to a gas flow for about forty-five seconds to partially dry the glue. The gas can be heated, in which case the flow time may be reduced. The glue 104, when originally spread out over any material to which it is being applied, is liquid. By partially drying out the glue 104, either by air drying for a selected time or by providing a gas flow over the surface of the glue, the glue 104 becomes a sticky paste much like the glue on a tape. The gas flowing over the glue 104 can be, for example, air or dry nitrogen. The gas dehumidifies the glue 104, improving manufacturing throughput compared to the pressing process described previously wherein the glue 104 is not dried for an appreciable time prior to placing layer 106 in place. The second panel, for example the bottom layer 106, is then placed over and pressed against the material on the other side of the glue 104 (as in the example of FIG. 1, top layer 102) for a selected time at a selected pressure.

In one embodiment glue 104 covers less than all of the area of gypsum sheets 102 and 106. The glue 104 may be applied in a variety of patterns. Examples include thin vertical strips, thin horizontal strips, dots, squares, and checkerboard. The spacing between glue 104 pattern elements is less than a half wave length of the maximum frequency of sound to be attenuated; typically a maximum of six inches. In one embodiment the glue 104 is $1/16^{th}$ of an inch thick; other thicknesses may be used. Glue 104 may be applied with a brush, putty knife, caulking gun, sprayed on, using glue tape or other means.

Figure 2B:
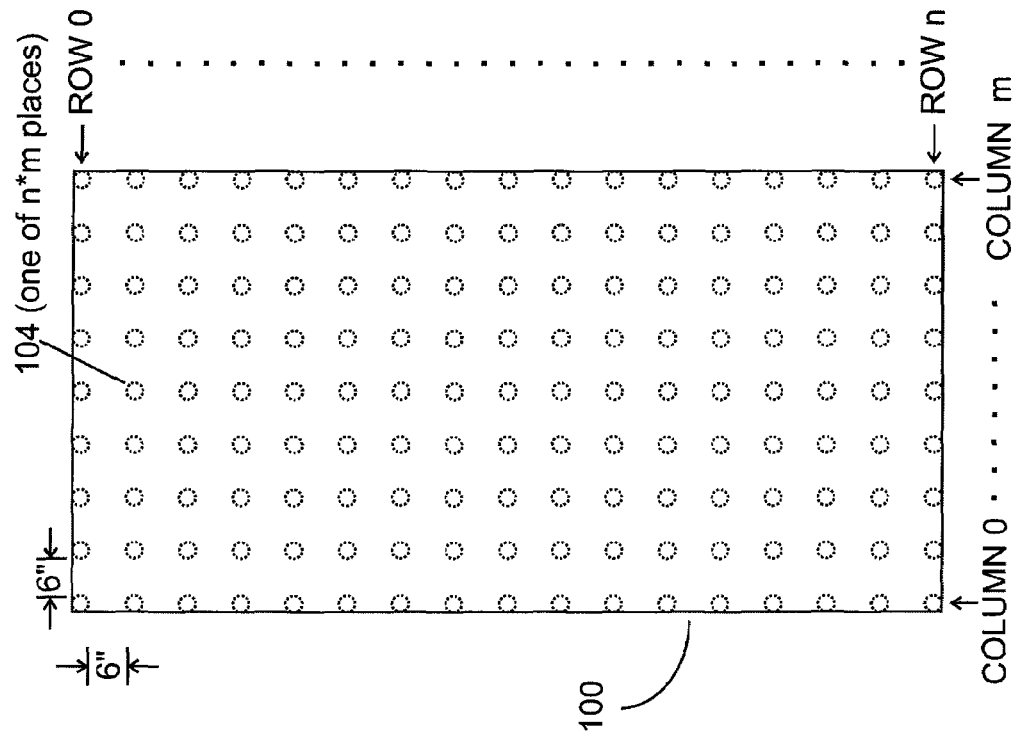
FIG. 2B is an example of a pattern for applying a matrix of patches of glue on a laminated structure in accordance with the present invention.
Figure 2A:
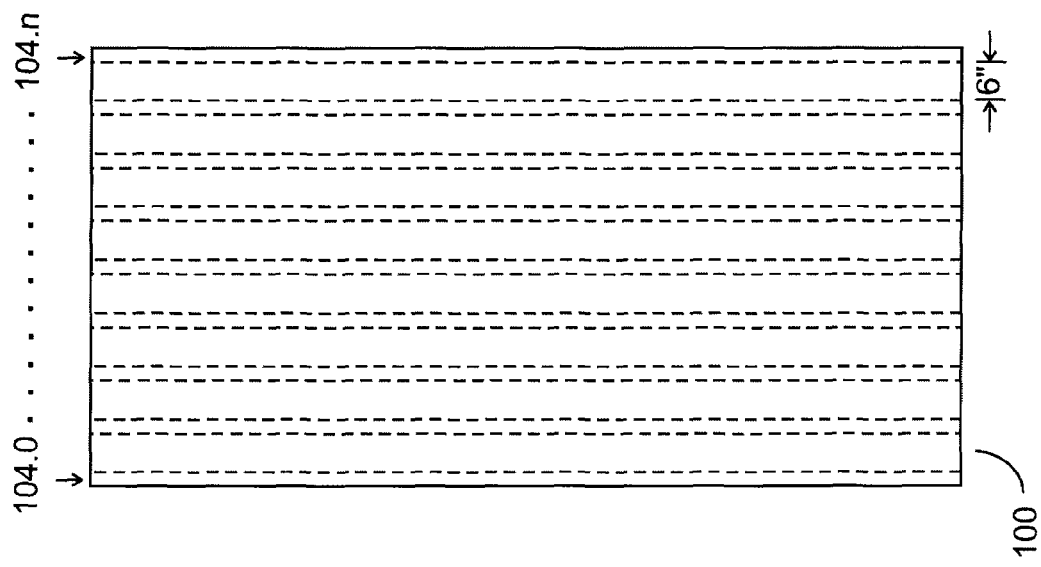
FIG. 2A is an example of a pattern for applying stripes of glue on a laminated structure in accordance with the present invention.

FIG. 2A shows glue 104 patterned as vertical strips on a 4'×8' gypsum sheet. The terms "vertical" and "horizontal", "top" and "bottom" apply only to FIGS. 2A, 2B, 3A and 3B as shown for the purpose of discussion; the panel 100 may be installed in any orientation. Looking to FIG. 2A, "n" vertical strips of glue 104.0 to 104.n are placed on gypsum sheet 102 with six inches or less spacing between strips. For example, for a 4'×8' gypsum sheet, there are a minimum of n=9 vertical strips across the top/bottom four-foot span. A 4'×8' sheet has 4,608 sq inches of surface area. For glue to cover twenty percent of the surface (i.e. twenty percent coverage), each strip is ((4608/96)/9)*(0.20) or about one inch wide, ninety-six inches long. For eighty percent coverage, each strip is about 4.25 inches wide, 96 inches long. In one embodiment there are more strips, spaced more closely together. For example seventeen vertical strips (that is, n=17) approximately one half inch wide on approximately three inch centers provides approximately twenty percent coverage. Other combinations of strip width and spacing may be used. The strips may be applied horizontally instead of vertically.

FIG. 2B is another example of a pattern for applying the glue 104, shown as patches on a 4'×8' panel. For the example shown, with a maximum spacing of six inches, nine circularly-shaped patches are applied in the horizontal direction and seventeen in the vertical direction, providing a matrix of circles as shown. The area of each patch, described as an effective diameter of a circle is found as:

$$D=2(SQRT((4608\times(\% \text{ coverage}))/((17\times 9)\times pi)).$$

Using the above formula, for twenty percent coverage each patch is approximately 2¾ inches diameter, and for eighty percent coverage each patch is approximately 5½ inches in diameter. Though the patches are referred to and shown as circles, the shape is not important. As with strips, more circles of a smaller diameter may be used. For example, 300 circles each of two inch diameter provide twenty percent coverage. In some embodiments a large number of smaller patches of glue 104 is used to insure keeping the laminate together when pieces are cut for installation in a small area.

Figure 3B:
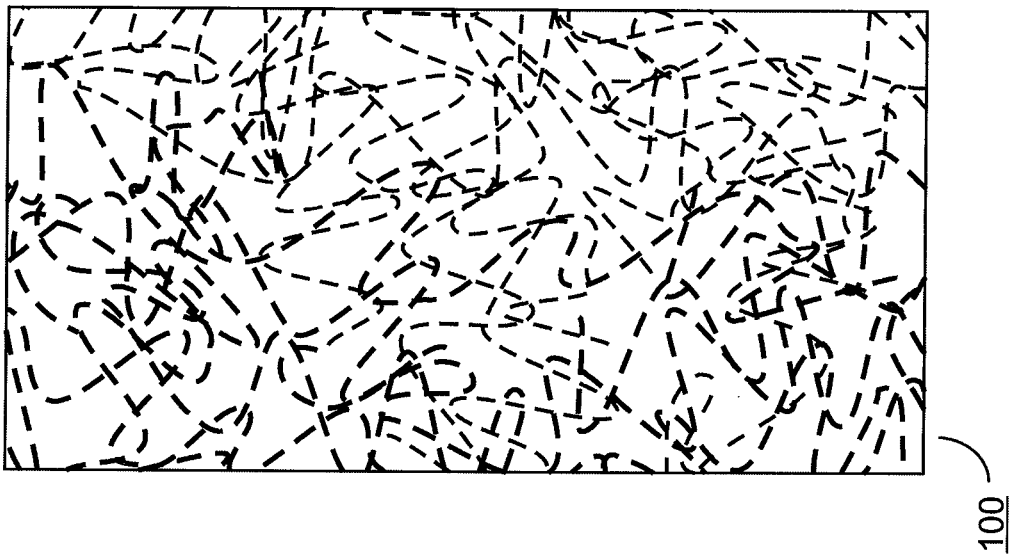
FIG. 3B is an example of a random pattern for applying glue on a laminated structure in accordance with the present invention.
Figure 3A:
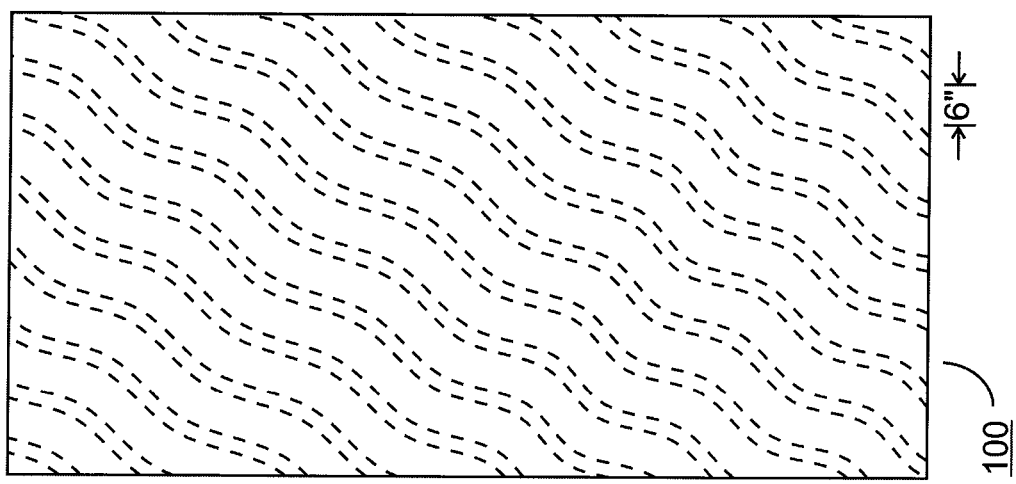
FIG. 3A is an example of a wavy pattern for applying glue on a laminated structure in accordance with the present invention.

A variety of patterns may be used in applying the glue 104 during construction of the laminar panel 100. A consideration in selecting a pattern is to insure that when a laminar panel 100 is cut during installation there will be some glue 104 near the panel cut edge, thus providing a bond at the cut edge to diminish the likelihood of panel 100 coming apart due to handling. For example, the pattern of FIG. 2A might be cut vertically on the right side next to the left edge of a vertical strip, resulting in a significant gap in glue 104 coverage down the cut edge (assuming the piece to the left is the portion being installed). Accordingly, some patterns are used that improve edge coverage, regardless of the location of the cutting line. One example of such a pattern is shown in FIG. 3A, wherein the glue pattern is wavy. A typical straight cut of the laminated panel 100 with a glue 104 pattern as shown in FIG. 3A would result in some glue 104 at the cut edge. As with vertical or horizontal straight strips, the wavy strips are spaced a maximum distance apart, the maximum spacing being no greater than a half wavelength of sound in the frequency of interest for the material being used for panels 102, 106. The pattern shown is FIG. 3B is another embodiment of a glue 104 pattern wherein there is likely to be glue 104 coverage to a typical cut edge. The pattern shown in FIG. 3B may be made, for example, by a random path of a glue gun. Complete coverage of an edge by glue 104 is not required; partial glue 104 coverage of individual edges will generally hold the resulting laminar panel 100 pieces together for installation. Other patterns including randomly shaped patterns of glue can also be used if desired.

Figure 4:
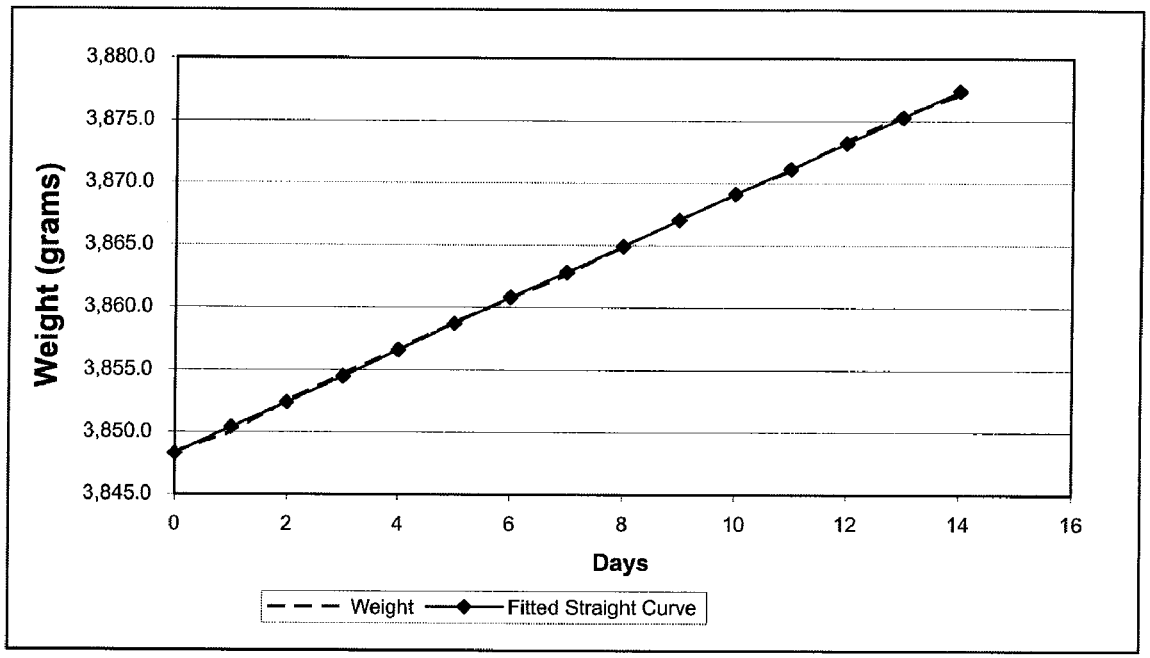
FIG. 4 shows permeance test results for one sample embodiment of a laminar material constructed in accordance with the present invention.

FIG. 4 shows permeance test results for an embodiment wherein twenty percent of the area of gypsum sheets 102, 106 is covered by glue 104. The sample tested was constructed consistent with FIG. 1, and was 0.66 sq feet. In the span of 336 hours (14 days) 449 grains of water ((3877.4−3848.3)*15.432) were passed through the laminated structure 100 sample, or 2.02 grains per hour per square foot. The vapor pressure of water at seventy degrees, fifty percent RH is 0.3696; therefore the sample test results indicate 5.467 perms (2.02/(0.3696)). One gram of water corresponds to 15.432 grains of water.

Figure 5:
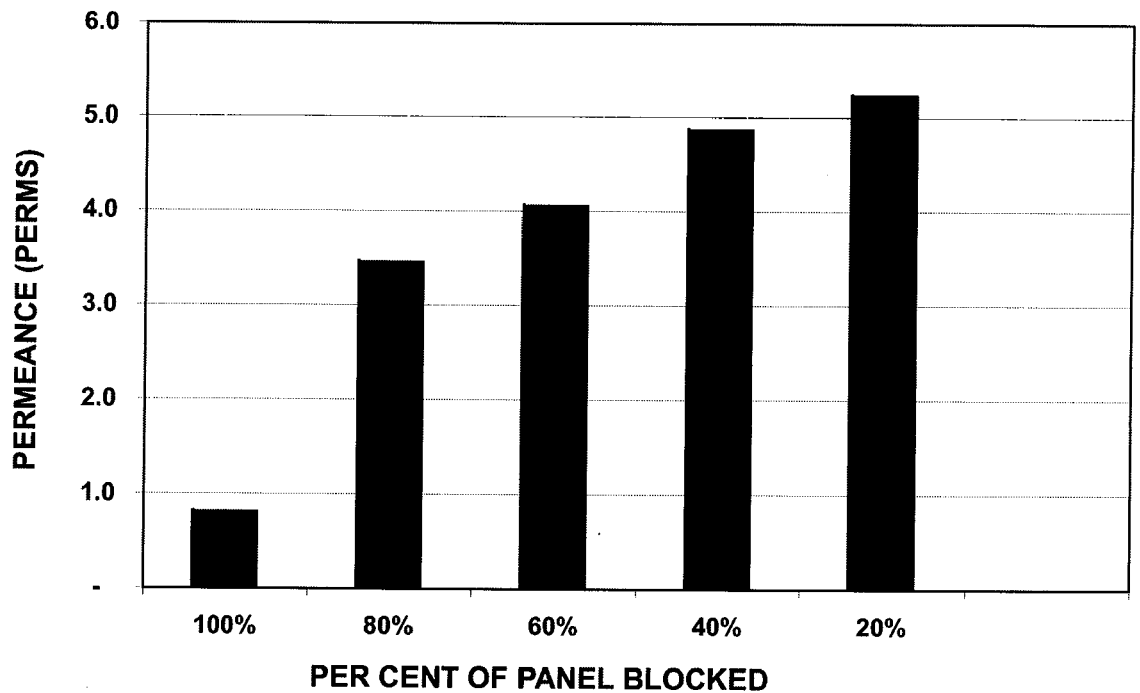
FIG. 5 shows permeance test results for several examples of laminar materials constructed in accordance with the present invention wherein different percent coverage of glue were applied.

The permeance value of the finished laminate 100 increases as the portion of the sheets 102,106 covered by glue 104 decreases. FIG. 5 illustrates this relationship. As seen in FIG. 5, full (100%) coverage of the gypsum sheets results in a very low value of permeance, thus making full coverage unsuitable for a structure where moisture and/or temperature extremes are anticipated and a vapor barrier covers the opposing side of a cavity formed by interposed studs.

Figure 6:
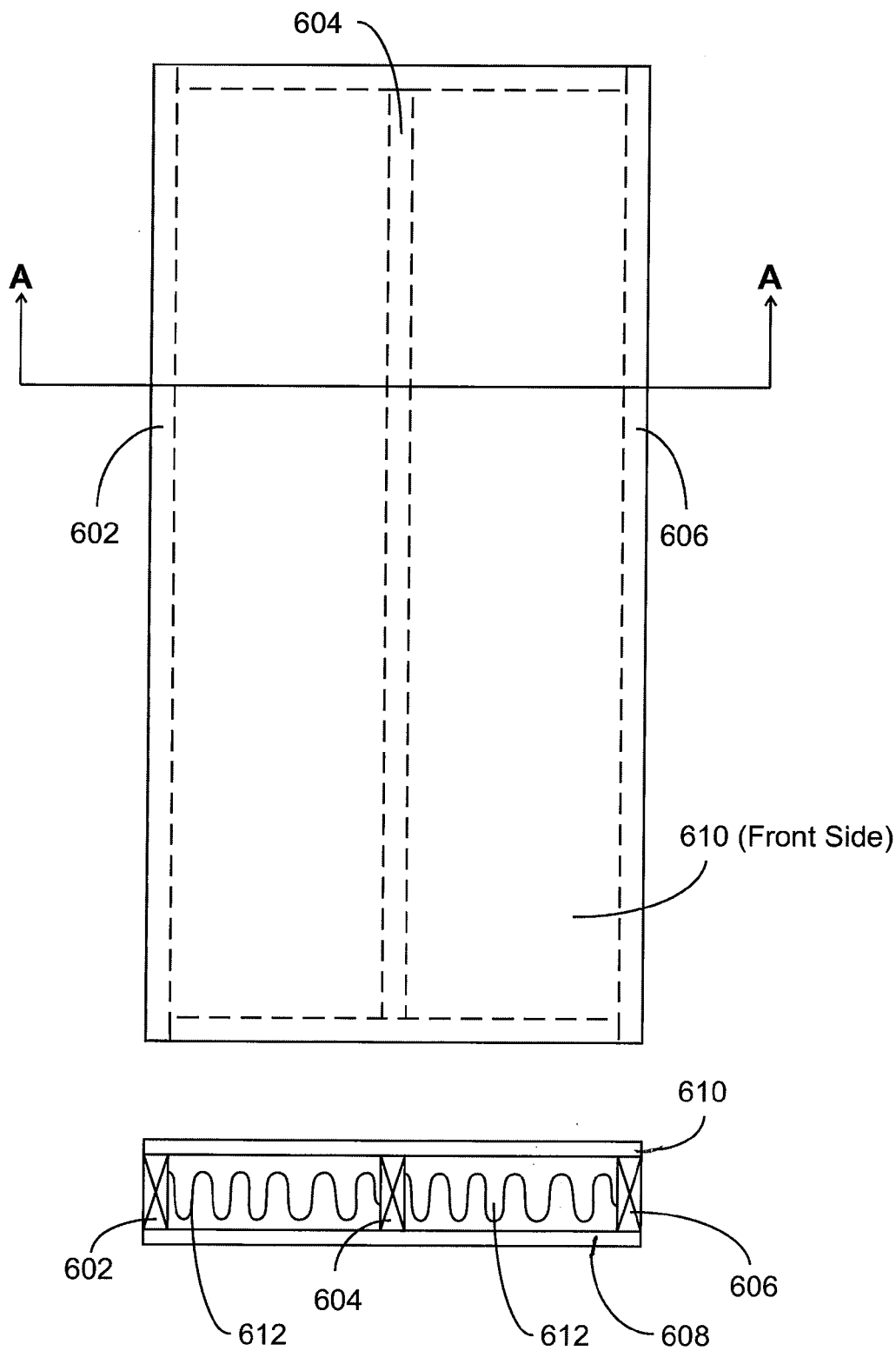
FIG. 6 shows a wall structure wherein one element of the structure comprises a laminar panel constructed in accordance with the present invention.

FIG. 6 is an example of a wall structure comprising a laminated panel 608 constructed in accordance with the present invention (i.e., laminate 100); wood studs 602, 604, and 606; batt-type insulation 612; and a ⅝$^{th}$ inch sheet of standard gypsum drywall 610, with their relationship shown in Section A-A. FIG. 7 shows the results of sound testing for a structure as in FIG. 6 for differing proportions of coverage of the glue 104 in the laminated panel 608, wherein the panel 608 is constructed as shown in FIG. 1. Sound attenuation values (STC numbers) were essentially the same for all samples; an STC of approximately 49. It is known to those practicing in this field that a similar configuration with standard ⅝ inch drywall on both sides of standard 2×4 construction yields an STC of approximately 34. Accordingly, this invention yields a 15 STC point improvement over standard drywall in this particular construction. The testing results data of FIG. 7 is shown graphically in FIG. 8.

Figure 8:
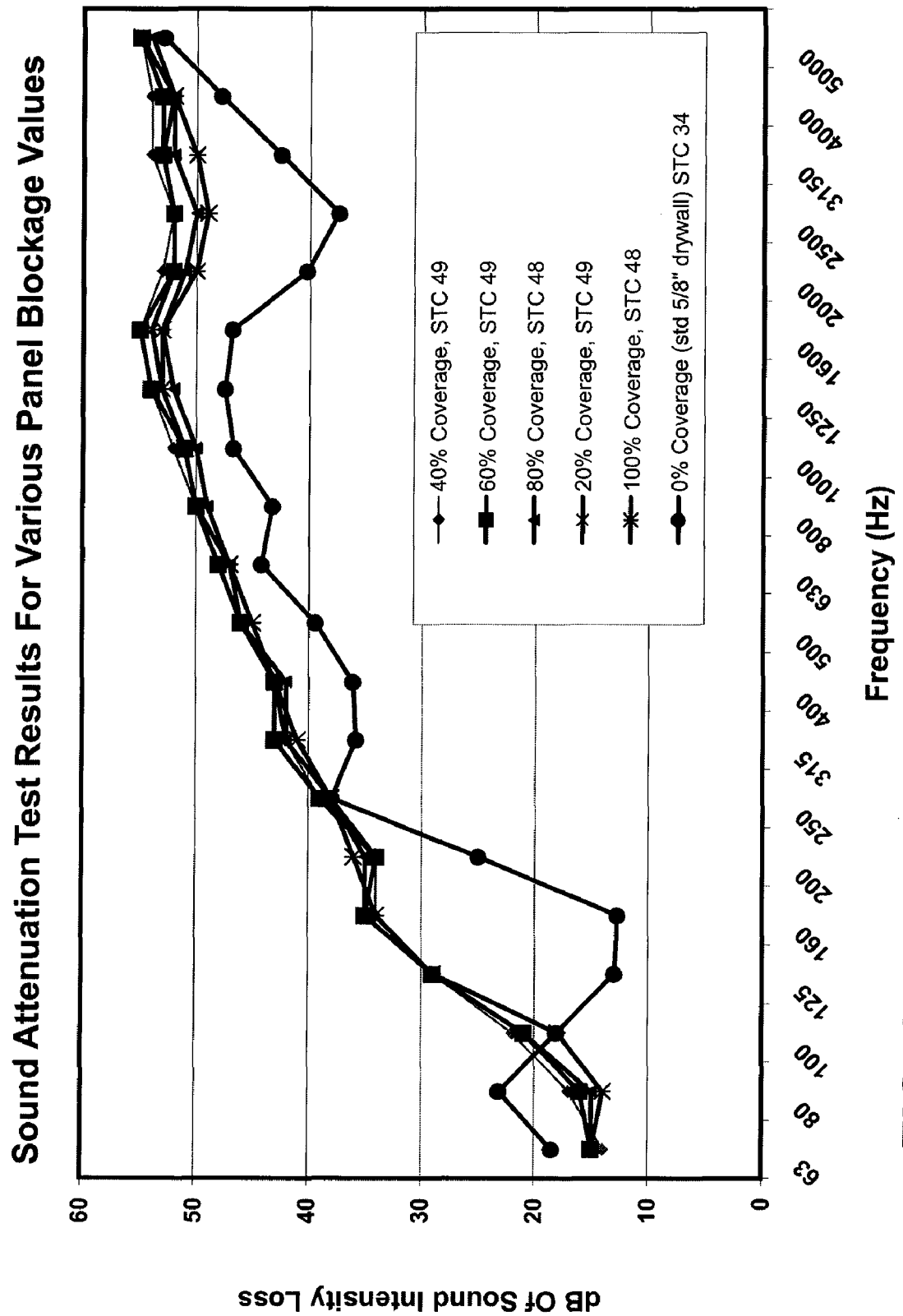
FIG. 8 graphically shows the test results of FIG. 7.

In FIG. 8 it is seen that the degree of sound attenuation is approximately the same for all values of coverage by the glue 104. In some embodiments less glue 104 is preferred for use in construction of the laminated panel 100 to lower the cost of the finished panel 100.

Figure 9:
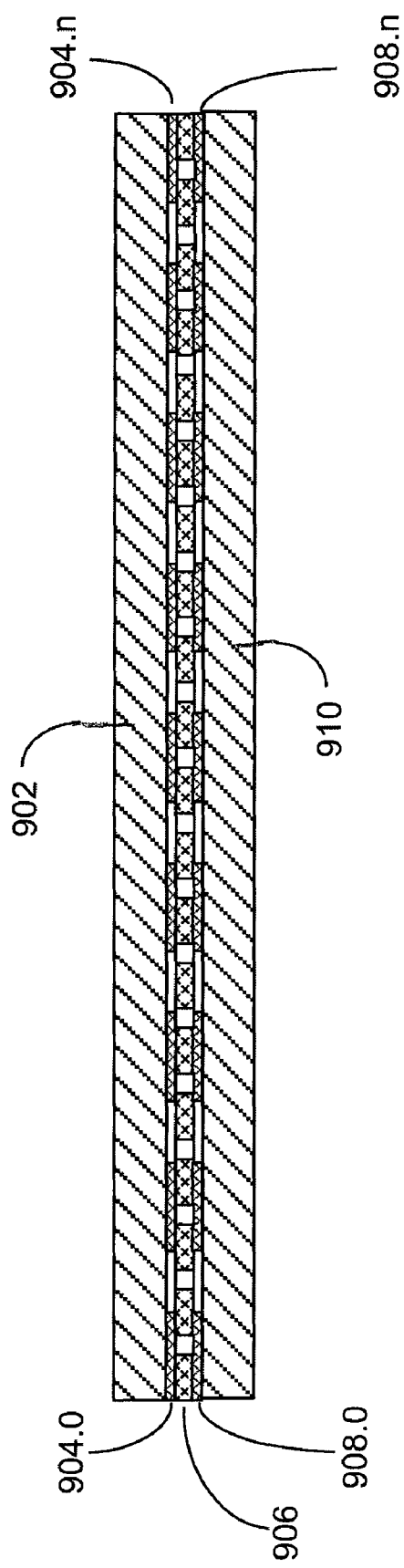
FIG. 9 shows an embodiment of a laminated structure containing five (5) layers of material capable of significantly reducing the transmission of sound through the material while providing for the transportation of moisture through the material.

In FIG. 9, two external layers of gypsum board 902 and 910 have on their interior faces glue layers 904 and 908, respectively. Between the two glue layers 904 and 908 is a constraining layer 906 made up of vinyl, steel, wood, or another material suitable for the application. If layer 906 is vinyl, the vinyl is mass loaded and, in one embodiment, is one pound per square foot or greater. Mass loaded vinyl is available from a number of manufacturers, including Technifoam, Minneapolis, Minn. The constraining layer 906 may improve the sound attenuation characteristics of a laminated panel so constructed. The constraining layer 906 will, as do the glue areas 904 and 908, block the transmission of moisture. The ability of a panel to pass (i.e. "transport") moisture will be determined by the total area blocked, whether by glue 904, glue 908 (which may or may not be aligned with glue 904) or the constraining layer 906. The blocking effect is the total area of the three layers (904, 906, 908) insofar as any of the three layers is not covered by one or more of the other layers. Said differently, an area portion that is covered by more than one area is only counted once. For example, if the patterns of layers 904, 906, and 908 were of the same pattern and well aligned each to the other, the covered area would be simply the area of one of the three layers. If the pattern of each layer were misaligned to each of the other two layers, the total area covered, hence not available for the transportation of water vapor, would be the sum of the area covered by each layer. A constraining layer 906 of material which transports water vapor, for example a thin sheet of Tyvek material, does not contribute to the coverage of the outer layers 902 and 910 insofar as vapor transportation is concerned, but may contribute additional attenuation of sound intensity. That is, when layer 906 is a material that transports water vapor, only the areas of the glue 904 and glue 908 are considered in determining the blocking portion.

Examples of materials for the constraining layer 906 include perforated steel, expanded steel and mass-loaded vinyl or similar product. However, steel has a higher Young's Modulus than vinyl and thus can outperform vinyl as a constraining layer. However, for other ease-of-cutting reasons, vinyl can be used in the laminar structure in place of steel, if desired. Cellulose, wood, plastic or other constraining materials may also be used in place of vinyl or metal. The alternative material can be any type and any appropriate thickness. In the example of FIG. 9, the constraining material 906 approximates the size and shape of the glue 904 and 908 to which it is applied. The glue layers 904 and 908 and constraining material 908 are shown in a plurality of locations in FIG. 9 to reflect their being applied in a pattern, as previously described.

In fabricating the structure of FIG. 1, the glue 104 is first applied to the bottom surface of gypsum 102 in a prescribed manner in a selected pattern, typically to 1/16 inch thickness, although other thicknesses can be used if desired. The top surface of bottom layer 106 is placed over the exposed surface of glue 104 and thus pressed against top layer 102. Depending on the drying and dehumidification techniques deployed, anywhere from five minutes to thirty hours are required to totally dry the glue 104 in the case that the glue is water-based. A solvent-based viscoelastic glue can be substituted.

In fabricating the structure of FIG. 9, the method is similar to that described for the structure of FIG. 1. However, before the bottom layer 910 is applied (bottom layer 910 corresponds to bottom layer 106) the constraining material 906 is placed over the locations of the glue 904. The constraining material 906 may be larger or smaller than the area of the glue 904 or 908 pattern areas, with consideration of the degree to which the resulting laminate blocks the transportation of water vapor, due to the non-transport characteristic of the constraining layer 906 as discussed hereinbefore. A second layer of glue 908 is applied to the exposed surface of the constraining material (i.e. on the side of the constraining material that is facing away from the top layer 902). In one embodiment the glue layer 908 is applied to the interior side of bottom layer 910 instead of being applied to layer 906. The bottom layer 910 is then placed over the stack of layers 902, 904, 906 and 908. The resulting structure is dried for from approximately five minutes to approximately forty eight hours under a pressure of approximately two to five pounds per square inch, depending on the exact requirements of each assembly, although other pressures may be used as desired.

Accordingly, the laminar structure of this invention provides a significant improvement in the sound transmission class number associated with the structures and thus reduces significantly the sound transmitted from one room to adjacent rooms while simultaneously providing for significant transportation of moisture. By using patterned glue, lower manufacturing cost is achieved.

The structures of FIG. 1 and FIG. 9 can be fabricated using a continuous porous septum constraining layer as well as systems without a septum. A septum is a thin partition or membrane between two other layers of material. While this term often is used in describing a membrane between two masses of tissue in a plant or animal, in the context of this invention the term "septum" is used to describe a porous continuous constraining layer.

In addition, the external materials (the two layers 102 and 106 in FIG. 1 and the two layers 902 and 910 in FIG. 9) can be fabricated not only of gypsum but also of ceramic, wood, magnesium oxide, cement mixtures, concretes and ceramic materials including phosphates. Methods for fabricating each of these layers using each of these materials or combinations thereof are well known and thus will not be described in detail.

The dimensions given for each material in the laminar structures of this invention can be varied as desired to control cost, overall thickness, weight, anticipated moisture and temperature control requirements, and STC results. The described embodiments and their dimensions are illustrative only and not limiting.

Other embodiments of this invention will be obvious in view of the above description.

What is claimed is:

1. A laminated structure appropriate for use in constructing walls, floors, ceilings or doors, said laminated structure having a selected area, said laminated structure comprising:
    two external layers of one or more materials each having an outer and an inner surface;
    at least one internal constraining layer having an area less than said selected area; and
    two or more internal layers of a viscoelastic glue in direct contact with the inner surface of the external layers and separated by said at least one internal constraining layer, wherein
    each of said layers of viscoelastic glue is patterned to cover between about twenty (20%) and about eighty (80%) percent of said selected area of said laminated structure, and wherein
    the internal layers of viscoelastic glue and the internal constraining layer each have a portion not overlapped by any of the other internal layers of viscoelastic glue or by the internal constraining layer;
    thereby allowing moisture to pass through said structure.

2. The structure of claim 1 wherein said two external layers comprise gypsum wallboard.

3. The structure of claim 1 wherein said at least one internal constraining layer comprises a material selected from the group consisting of vinyl, steel, wood, plastic and a cellulose-based material.

4. The laminated structure as in claim 3, wherein said internal constraining layer comprises a sheet metal layer of selected thickness.

5. The laminated structure as in claim 4, wherein said sheet metal layer of selected thickness comprises galvanized steel.

6. The structure of claim 1 wherein said two or more internal layers of viscoelastic glue each comprise a viscoelastic glue selected from the group consisting of a water-based viscoelastic glue and a solvent-based viscoelastic glue.

7. The structure of claim 1 wherein each external layer of said material is non-metallic and non-glass.

8. The structure of claim 1 wherein each external layer of a material comprises a material selected from the group consisting of gypsum, ceramic, wood, magnesium oxide (MgO), cement, concrete and ceramic mixtures employing phosphates.

9. The structure of claim 1 wherein said at least one internal constraining layer is formed of a continuous porous septum material.

10. The laminated structure as in claim 1, wherein said two external layers each comprise a selected thickness gypsum board layer.

11. The laminated structure as in claim 10, wherein said glue comprises a viscoelastic material capable of absorbing sound.

12. The structure of claim 1 wherein a pattern in each viscoelastic glue layer comprises elements that are spaced less than a half wavelength of the maximum frequency of sound to be attenuated.

13. A laminated structure having a selected area, said laminated structure being appropriate for use in constructing walls, floors, ceilings or doors and comprising:
    two external layers of a non-metallic material each having an outer and an inner surface;
    at least one internal constraining layer having an area less than said selected area; and
    two or more internal layers of a viscoelastic glue in direct contact with the inner surface of the external layers and separated by said at least one internal constraining layer,
    each of said layers of viscoelastic glue having an area between about twenty (20%) and about eighty (80%) percent of said selected area, and wherein
    the internal layers of viscoelastic glue each have a portion not overlapped by one or more of the other internal layers of viscoelastic glue or by the internal constraining layer;
    thereby allowing moisture to pass through the resulting structure.

14. The laminated structure of claim 13 wherein the internal constraining layer comprises metal.

15. A laminated structure comprising:
    at least one internal layer of a selected material having an upper and a lower surface;
    two internal layers of a viscoelastic glue, one such layer on each of the upper and the lower surface of said internal layer; and
    at least one additional layer of a material on the other side of each internal layer of viscoelastic glue, wherein
    the two internal layers of viscoelastic glue each occupy an area less than the between about twenty (20%) and about eighty (80%) percent of area of said at least one additional layer of a material on the other side of each internal layer of viscoelastic glue, and wherein
    the internal layers of the viscoelastic glue and the at least one internal layer of selected material occupies an area less than the area of said at least one additional layer of a material on the other side of each internal layer of viscoelastic glue; and the internal layer of a selected material have a portion not overlapped by any of the other internal layers of viscoelastic glue or by the internal layer of a selected material;

thereby allowing vapor to pass through said laminated structure.

16. The laminated structure as in claim 15 wherein each said at least one additional layer comprises an external layer of a first sound attenuating material.

17. The laminated structure as in claim 16 wherein each said external layer of a first sound attenuating material comprises gypsum.

18. The laminated structure as in claim 16 wherein each said at least one external layer comprises a plurality of layers of selected materials.

19. The laminated structure as in claim 18 wherein said plurality of layers of selected materials comprises: a first layer of metal; a second layer of viscoelastic glue; and a third layer of selected material.

20. The laminated structure as in claim 19 wherein said third layer of selected material comprises gypsum.

21. The laminated structure as in claim 15 wherein said at least one internal layer comprises a metal layer.

22. The laminated structure as in claim 15 wherein said at least one internal layer comprises a cellulose material.

23. The laminated structure as in claim 15 wherein said at least one internal layer comprises a layer of a solid petroleum-based synthetic material selected from the group consisting of a vinyl, plastic composite and rubber.

24. A laminated structure appropriate for use in constructing walls, floors, or ceilings or doors comprising:
two external layers of a non-metallic material each having an outer and an inner surface;
at least one internal constraining layer, and
two or more internal layers of a viscoelastic glue in direct contact with the inner surface of the external layers and separated by said at least one internal constraining layer, wherein
the at least one internal constraining layer is selected from the group consisting of cellulose, wood, metal, plastic, vinyl, plastic composite and rubber, and wherein the at least one internal constraining layer
occupies an area of said laminated structure less than the area of said laminated structure, and each of said layers of viscoelastic glue is patterned to cover between about twenty (20%) and about eighty (80%) percent of the area of said laminated structure, and wherein
the internal layers of viscoelastic glue and the at least one internal constraining layer each have a portion not overlapping by the other internal layers of viscoelastic glue or by the internal constraining layer;
thereby allowing the passage of moisture through said laminated structure.

25. The laminated structure as in claim 24 wherein said at least one internal constraining layer is wood.

26. The laminated structure as in claim 24 wherein said at least one internal constraining layer is cellulose.

27. A laminated structure appropriate for use in constructing walls, floors, ceilings or doors, said laminated structure having a selected area, said laminated structure comprising:
two external layers of one or more materials each having an outer and an inner surface; and
one internal layer of a viscoelastic glue in contact on each side with the inner surface of each of said two external layers, wherein said internal layer of viscoelastic glue is patterned to cover between about twenty (20%) and about eighty (80%) percent of of said area of said laminated structure, thereby allowing moisture to pass through said structure.

28. The structure of claim 27 wherein said two external layers comprise gypsum wallboard.

29. The structure of claim 27 wherein a pattern in the one or more internal layers of viscoelastic glue comprises elements that are spaced apart from each other by a distance less than a half wavelength of the maximum frequency of sound to be attenuated.

30. A method of forming a laminated structure appropriate for use in constructing walls, floors, ceilings or doors, said laminated structure having a selected area, said laminated structure capable of passing moisture from one side to the other side of the laminated structure, said method comprising:
forming two external layers of one or more materials each having an outer and an inner surface;
forming at least one internal constraining layer between said two external layers, the area of said at least one internal constraining layer being less than said selected area; and
joining said two external layers to said at least one internal layer using two or more internal layers of a viscoelastic glue in direct contact with the inner surface of the external layers and separated by said at least one internal constraining layer, wherein
each of said layers of viscoelastic glue is patterned to cover between about twenty (20%) and about eighty (80%) percent of said area of said laminated structure, and wherein
the internal layers of viscoelastic glue and the internal constraining area each have a portion not overlapped of the other internal layers of viscoelastic glue or the internal constraining layer;
thereby allowing moisture to pass through the resulting structure.

31. The method of claim 30 wherein a pattern in each viscoelastic glue layer comprises elements that are spaced apart form each other by a distance less than a half wavelength of the maximum frequency of sound to be attenuated.

* * * * *